(12) United States Patent
Kharpas et al.

(10) Patent No.: US 11,378,068 B2
(45) Date of Patent: *Jul. 5, 2022

(54) ELECTROHYDRAULIC PROPORTIONAL PRESSURE CONTROL FOR OPEN CIRCUIT PUMP

(71) Applicant: Danfoss Power Solutions II Technology A/S, Nordborg (DK)

(72) Inventors: Anil Balasaheb Kharpas, Maharashtra (IN); Avinash Dadaso Patil, Maharashtra (IN); Sanjay Dhondappa Mali, Maharashtra (IN); Amit Ranjit Panchal, Maharashtra (IN); Robert Leslie Isaacs, Buffalo, MN (US)

(73) Assignee: Danfoss Power Solutions II Technology A/S, Nordborg (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/927,316

(22) Filed: Jul. 13, 2020

(65) Prior Publication Data

US 2021/0025373 A1 Jan. 28, 2021

Related U.S. Application Data

(63) Continuation of application No. 15/751,374, filed as application No. PCT/US2016/046193 on Aug. 9, 2016, now Pat. No. 10,711,771.

(30) Foreign Application Priority Data

Aug. 10, 2018 (IN) ........................ 2449/DEL/2015

(51) Int. Cl.
*F04B 1/324* (2020.01)
*F15B 13/16* (2006.01)
(Continued)

(52) U.S. Cl.
CPC ............ *F04B 1/324* (2013.01); *F04B 49/002* (2013.01); *F04B 49/08* (2013.01); *F15B 13/024* (2013.01);
(Continued)

(58) Field of Classification Search
CPC ........ F04B 1/324; F04B 49/002; F04B 49/08; F15B 13/16; F15B 13/0402; G05D 16/2066
See application file for complete search history.

(56) References Cited

U.S. PATENT DOCUMENTS

| 4,132,506 A | 1/1979 | Dantlgraber |
| 4,158,290 A | 6/1979 | Cornell |

(Continued)

FOREIGN PATENT DOCUMENTS

| CN | 2010025250 Y | 2/2008 |
| CN | 203783840 U | 8/2014 |

(Continued)

OTHER PUBLICATIONS

International Search Report and Written Opinion of the International Searching Authority for corresponding International Patent Application No. PCT/US2016/046193 dated Nov. 17, 2016, 8 pages.

(Continued)

*Primary Examiner* — Michael Leslie
*Assistant Examiner* — Daniel S Collins
(74) *Attorney, Agent, or Firm* — Merchant & Gould P.C.

(57) ABSTRACT

A pump control assembly for controlling a variable displacement hydraulic pump includes a spool mounted within a valve block. The spool is configured to move between a first and a second position within the valve block so as to selectively control the displacement of the attached pump. The pump control assembly further includes first and second (Continued)

chambers that each apply a force to opposite ends of the spool. The first chamber is positioned at a first end of the spool in fluid communication with a pump output port. The second chamber is positioned at a second end of the spool and in fluid communication with a hydraulic tank port and a proportional pressure reducing valve. The second chamber also includes a piston and first and second springs positioned on either side of the piston. The proportional pressure reducing valve provides a regulated pressure to a first side of the piston along with the first spring, and the hydraulic tank port provides a tank pressure on the opposite side of the piston along with the second spring. The pump control assembly also includes a stop structure having a positive stop that limits movement of the piston in a direction toward the first chamber.

19 Claims, 7 Drawing Sheets

(51) Int. Cl.
| | | |
|---|---|---|
| *F15B 13/044* | (2006.01) | |
| *G05D 16/20* | (2006.01) | |
| *F04B 49/00* | (2006.01) | |
| *F15B 13/04* | (2006.01) | |
| *F04B 49/08* | (2006.01) | |
| *F15B 13/02* | (2006.01) | |

(52) U.S. Cl.
CPC .......... *F15B 13/04* (2013.01); *F15B 13/0402* (2013.01); *F15B 13/044* (2013.01); *F15B 13/16* (2013.01); *G05D 16/2066* (2013.01); *F15B 2211/20553* (2013.01)

(56) References Cited

U.S. PATENT DOCUMENTS

| | | |
|---|---|---|
| 4,201,116 A | 5/1980 | Martin |
| 4,468,173 A | 8/1984 | Dantlgraber |
| 4,510,963 A | 4/1985 | Presley et al. |
| 4,699,571 A | 10/1987 | Bartholomaeus |
| 4,796,661 A | 1/1989 | Hishinuma et al. |
| 4,899,785 A | 2/1990 | Inokuchi |
| 5,226,349 A | 7/1993 | Alme et al. |
| 6,725,658 B1 | 4/2004 | Lemmen et al. |
| 9,429,152 B2 | 8/2016 | Yamaji |
| 9,657,754 B2 | 5/2017 | Matsushima |
| 10,711,771 B2 * | 7/2020 | Kharpas ................ F15B 13/024 |

FOREIGN PATENT DOCUMENTS

| | | |
|---|---|---|
| EP | 0 849 468 B1 | 1/2004 |
| JP | H10-184556 A | 7/1998 |

OTHER PUBLICATIONS

"Axial Piston Variable Pump A10VO (US-Version)", Rexroth Bosch Group, 60 pages, publically available prior to the filing of the Indian Provisional application Aug. 10, 2015.

Extended European Search Report for corresponding European Patent Application No. 16835785.3 dated Dec. 7, 2018, 4 pages.

* cited by examiner

ELECTROHYDRAULIC PROPORTIONAL PRESSURE CONTROL FOR OPEN CIRCUIT PUMP

CROSS-REFERENCE TO RELATED APPLICATION

This application is a continuation of U.S. Ser. No. 15/751,374, now U.S. Pat. No. 10,711,771, and is a U.S. National Stage Application of PCT/US2016/046193, filed on Aug. 9, 2016, which claims the benefit of Indian Patent Application No. 2449/DEL/2015, filed on Aug. 10, 2015, the disclosures of which are incorporated herein by reference in their entireties. To the extent appropriate, a claim of priority is made to each of the above disclosed applications.

BACKGROUND

Controlling the output flow of a variable displacement pump is important to maintain a stable hydraulic system. Doing so with accuracy can help protect the system from unintended damage and can aid in improving the overall efficiency of the hydraulic system.

Variable displacement pumps, specifically axial piston pumps, generally include a drive shaft, a cylinder barrel that is rotatable by the drive shaft, multiple piston bores positioned about the cylinder barrel, and multiple pistons positioned within the piston bores and attached to a tiltable swash plate. To control the displacement of the axial piston pump, the angle of the swash plate must be altered. Traditionally changing the angle is accomplished by a swash plate piston cylinder or solenoid. When the swash plate is tilted relative to the longitudinal axis of the drive shaft, the pistons reciprocate within the piston bores to produce a pumping action. Therefore, the larger the swash plate angle, the larger the displacement of the pump.

When controlling the swash plate piston cylinder or solenoid, the pressure from the hydraulic tank and the pressure from the hydraulic circuit are typically considered. For example, if a hydraulic spring-loaded piston cylinder is used to control the angle of the swash plate, tank pressure can act on one side of the piston and hydraulic circuit pressure can act on the other side of the piston. Depending on the difference between the two pressures and the spring constant, the piston will move within the cylinder accordingly. Because the piston is also attached to the swash plate, as the pressure difference changes and moves the piston, the swash plate angle also changes, thereby changing the displacement of the pump.

In other examples, when the swash plate is controlled by the action of a solenoid, the change in displacement of the pump is commonly proportional to the current supplied to the solenoid by a controller.

Customized real time control of the displacement of the pump is often desired. Therefore, the piston cylinders or solenoids often are configured to allow for the on-demand altering of the pump displacement. Additionally, hydraulic pressure within the hydraulic circuit can change abruptly during operation. Such changes can be caused by a failure, excess load, etc. Additionally, electronics controlling the displacement of the pump (i.e., by solenoid) can also fail, causing a drastic increase in pressure. Therefore, a separate pressure compensator device is often included as part of the system to safeguard the system in such scenarios.

Improvements in variable displacement pump control are desired.

SUMMARY

The present disclosure relates to pressure control. More particularly, the disclosure relates to proportionally controlling the outflow of a piston pump in an open hydraulic circuit.

In accordance with an aspect of the disclosure, a pump control assembly for controlling a variable displacement hydraulic pump is disclosed. The pump control assembly for controlling a variable displacement hydraulic pump includes a spool mounted within a valve block. The spool being configured to move between a first and a second position within the valve block so as to selectively control the displacement of the attached pump. The pump control assembly further includes first and second chambers that each apply a force to opposite ends of the spool. The first chamber is positioned at a first end of the spool in fluid communication with a pump output port. The second chamber is positioned at a second end of the spool and in fluid communication with a hydraulic tank port and a proportional pressure reducing valve. The second chamber also includes a piston and first and second springs positioned on either side of the piston. The proportional pressure reducing valve provides a regulated pressure to a first side of the piston along with the first spring, and the hydraulic tank port provides a tank pressure on the opposite side of the piston along with the second spring. The pump control assembly also includes a stop structure having a positive stop that limits movement of the piston in a direction toward the first chamber.

In accordance with another aspect of the disclosure, a pump control assembly for controlling a variable displacement hydraulic pump is disclosed. The pump control assembly for controlling a variable displacement hydraulic pump includes a valve block that defines a spool bore that has a central bore axis. The valve block also defines a pump output port, a pump displacement control port, and a tank port. The pump control assembly also includes a spool mounted within the spool bore. The spool has a first end and an opposite second end and is movable within the spool bore along the central bore axis between a first position where the tank port is in fluid communication with the pump displacement control port and a second position in which the pump output port is in fluid communication with the pump displacement control port. The spool moves in a first direction along the central bore axis when moving from the first position toward the second position. The spool moves in a second direction along the central bore axis when moving from the second position toward the first position. The first and second directions are opposite from one another.

The pump control assembly also includes a first chamber positioned at the first end of the spool. The first chamber is in fluid communication with the pump output port so as to be configured to receive a pump output pressure from the variable displacement pump when the pump control assembly is installed on the variable displacement pump. When the pump output pressure is applied to the first chamber, the pump output pressure applies a pump output pressure force to the spool in the first direction. The pump control assembly also includes a second chamber positioned at the second end of the spool. A piston is positioned within the second chamber so as to divide the second chamber into a first section and a second section. The first section is positioned between the piston and the second end of the spool, and the piston is movable within the second chamber along the central bore axis.

Further, the pump control assembly includes a first spring positioned within the first section of the second chamber for transferring a piston force in the second direction from the piston to the spool. A second spring is positioned within the second section of the second chamber for applying a preload force to the piston for biasing the piston in the second direction. The pump control assembly also includes a proportional pressure reducing valve mounted within the valve block. The proportional pressure reducing valve is operable in a first state where the tank port is in fluid communication with the second section of the second chamber and a second state where the pump output port is in fluid communication with the second section of the second chamber. The proportional pressure reducing valve is configured to convert the pump output pressure into a reduced pressure that is provided at the second section of the second chamber. The reduced pressure at the second section of the second chamber acts on the piston to apply a reduced pressure force to the piston in the second direction, and the magnitude of the reduced pressure output from the proportional pressure reducing valve is directly proportional to a current provided to a solenoid of the proportional pressure reducing valve.

Additionally, a stop structure is included in the pump control assembly. The stop structure has a positive stop that stops movement of the piston in the second direction along the central bore axis at a stop position that defines a maximum threshold for the piston force transferred by the first spring in the second direction from the piston to the spool. The stop position is adjustable along the central bore axis to adjust the maximum threshold of the piston force.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
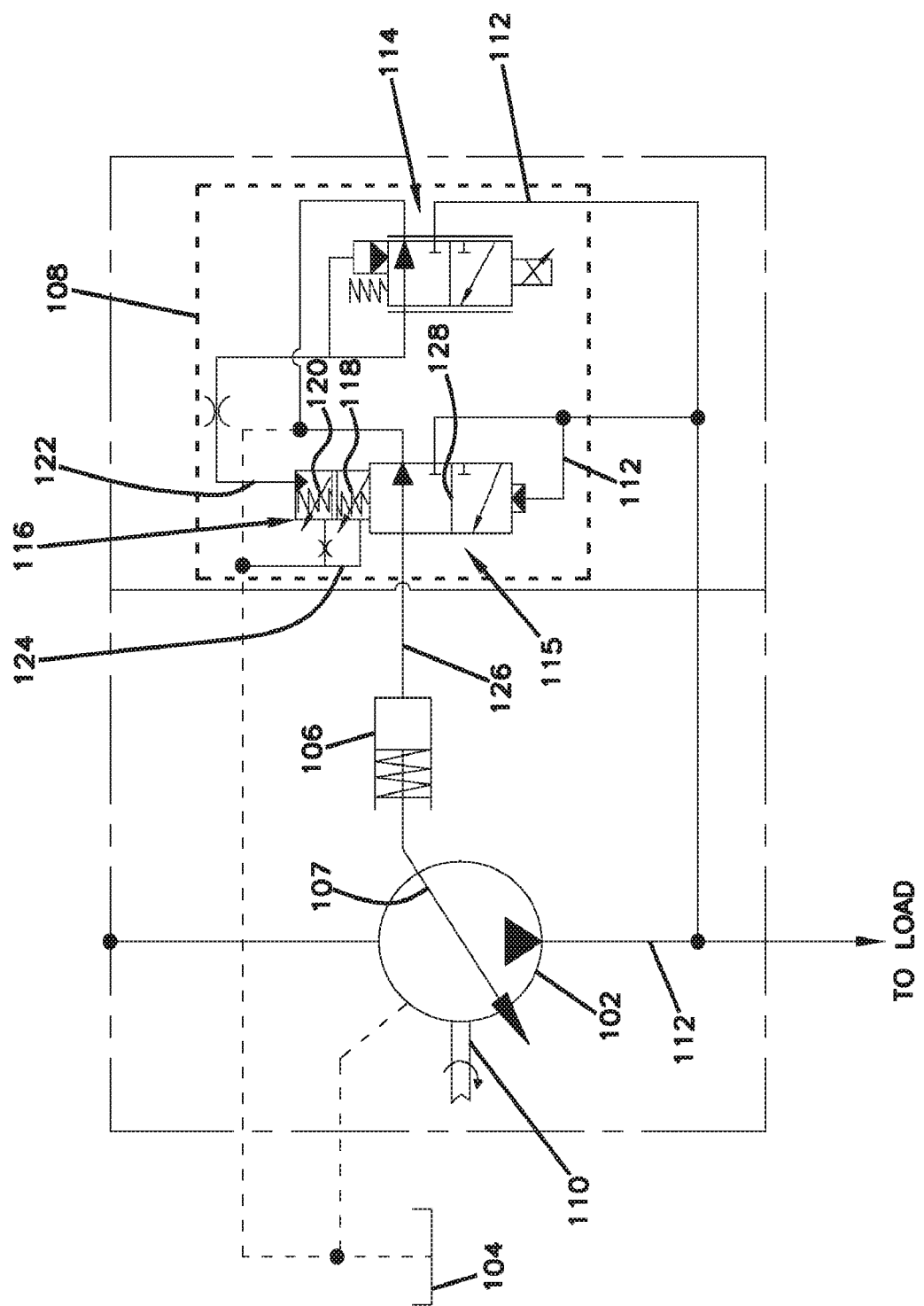
FIG. 1 illustrates a schematic view of a an example hydraulic system having features that are examples of inventive aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, an electro-hydraulic proportional pressure control valve (EHPPCV) for an axial piston pump is disclosed. In particular, the EHPPCV uses a hydraulically controlled spool valve to control the flow of fluid to the swash plate piston, thereby controlling the displacement of the pump. The spool valve's movement is determined by the relative difference in forces exerted by a spring-loaded piston at one end of the spool and the pump outlet pressure exerting a force at an opposite end of the spool. Forces within the spring-loaded piston can be varied by a pair of springs and a regulated pressure force supplied by a high pressure proportional pressure reducing valve that is controlled by an electric solenoid. Additionally, to safe guard the system, a mechanical stop is provided within the EHPPCV to prevent the spring loaded piston from exerting too high of a pressure on the spool valve, thereby leading to potentially over stroking the pump and possibly damaging the hydraulic circuit. Such a stop prevents the need to include a separate pressure compensator to safe guard the system. Also, the EHPPCV is configured to provide a step-less pressure control of the axial piston pump, thereby increasing the overall system stability.

FIG. 1 shows a hydraulic schematic of an example hydraulic system 100. The hydraulic system 100 includes a pump 102, a hydraulic fluid tank 104, a swash plate piston 106, and an EHPPCV arrangement 108.

The pump 102 is an axial piston pump. The pump 102 receives power by way of a drive shaft 110. The pump 102 is fluidly connected to the tank 104 and configured to pump fluid from the tank 104 to a hydraulic circuit 112.

The displacement of the pump is altered by the swash plate piston 106. The swash plate piston 106 is configured to change the angle of a swash plate 107 within the pump 102, thereby changing the displacement of the pump 102. As the pump displacement changes, the outlet pressure of the pump changes. A change in outlet pressure changes the fluid pressure within the hydraulic circuit 112. The position of the swash plate piston 106 is controlled by the EHPPCV arrangement 108.

The EHPPCV arrangement 108 includes a solenoid powered valve 114 and a spring-loaded piston cylinder 116. Both the solenoid powered valve 114 and the spring loaded piston cylinder 116 are configured to receive hydraulic fluid flow from the outlet of the pump 102 that is indicative of the flow and pressure of the hydraulic circuit 112. A force corresponding to a regulated pressure directed from the solenoid powered valve 114 and a force corresponding to the spring-loaded piston cylinder 116 are configured act on a single side of a spool valve 115.

The solenoid powered valve 114 is configured to provide a flow of fluid to the spring-loaded cylinder 116. The solenoid powered valve 114 is configured to receive an electrical current from a controller (not shown) and adjust the fluid flow leaving the solenoid powered valve 114 according to the magnitude of the electrical current. In the depicted embodiment, the solenoid powered valve 114 is configured to receive fluid from the hydraulic circuit 112 that has a pressure that is equal to the pump output pressure. The solenoid powered valve 114 then converts the fluid at pump output pressure to a regulated pressure (line 122). In some embodiments, the regulated pressure is a reduced pressure relative to the pressure of the hydraulic circuit 112. In the depicted embodiment, the solenoid powered valve 114 is a proportional pressure reducing valve; therefore, the regulated pressure output (line 122) from the solenoid powered valve 114 is directly proportional to a current provided to the solenoid powered valve 114 by a controller. Additionally, in the depicted embodiment, the displacement of the pump 102 is also directly proportional to the current supplied to the solenoid powered valve 114.

The spring-loaded piston cylinder 116 is configured to exert a force on one side of the spool valve 115. The spring-loaded piston cylinder 116's behavior is influenced by a first spring 118, a second spring 120 and by two separate fluid pressures. The two separate fluid pressures include the regulated fluid pressure (line 122) received from the solenoid powered valve 114 and a tank fluid pressure (line 124) which is representative of the pressure within the tank 104. The operation of the EHPPCV arrangement 108 will be explained in more detail with respect to FIGS. 5-6.

The spool valve 115 is shown to be in fluid communication with the solenoid powered valve 114, the spring-loaded piston cylinder 116, and the hydraulic circuit 112. The hydraulic circuit 112 provides a pressure indicative of the outlet pump pressure at one side of the spool valve 115, while the solenoid powered valve 114 and the spring-loaded piston cylinder 116 provide a pressure at the opposite side of the spool valve 115. Accordingly, the spool valve 115 is configured to deliver a fluid flow (line 126) to the swash plate piston 106, thereby manipulating the swash plate piston 106 to achieve a desired displacement of the pump 102.

Figure 2:
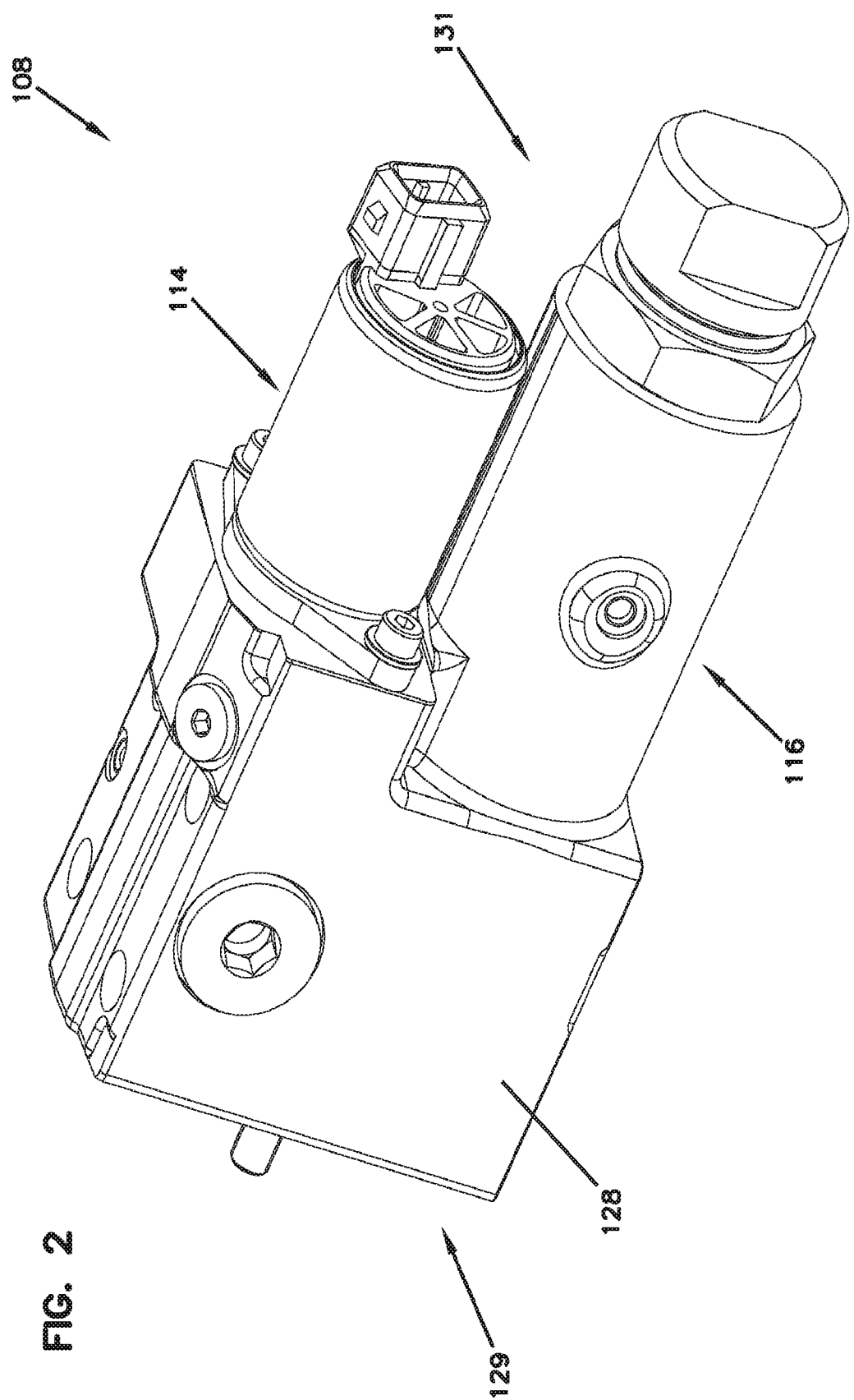
FIG. 2 illustrates a perspective view of an electro-hydraulic proportional pressure control valve having features that are examples of inventive aspects in accordance with the principles of the present disclosure.

FIG. 2 shows a perspective view of the EHPPCV arrangement 108. The EHPPCV arrangement 108 can be mounted to the pump 102 or in a separate location. In some embodiments, the EHPPCV arrangement 108 is mounted within a housing (not shown) of the pump 102.

Figure 3:
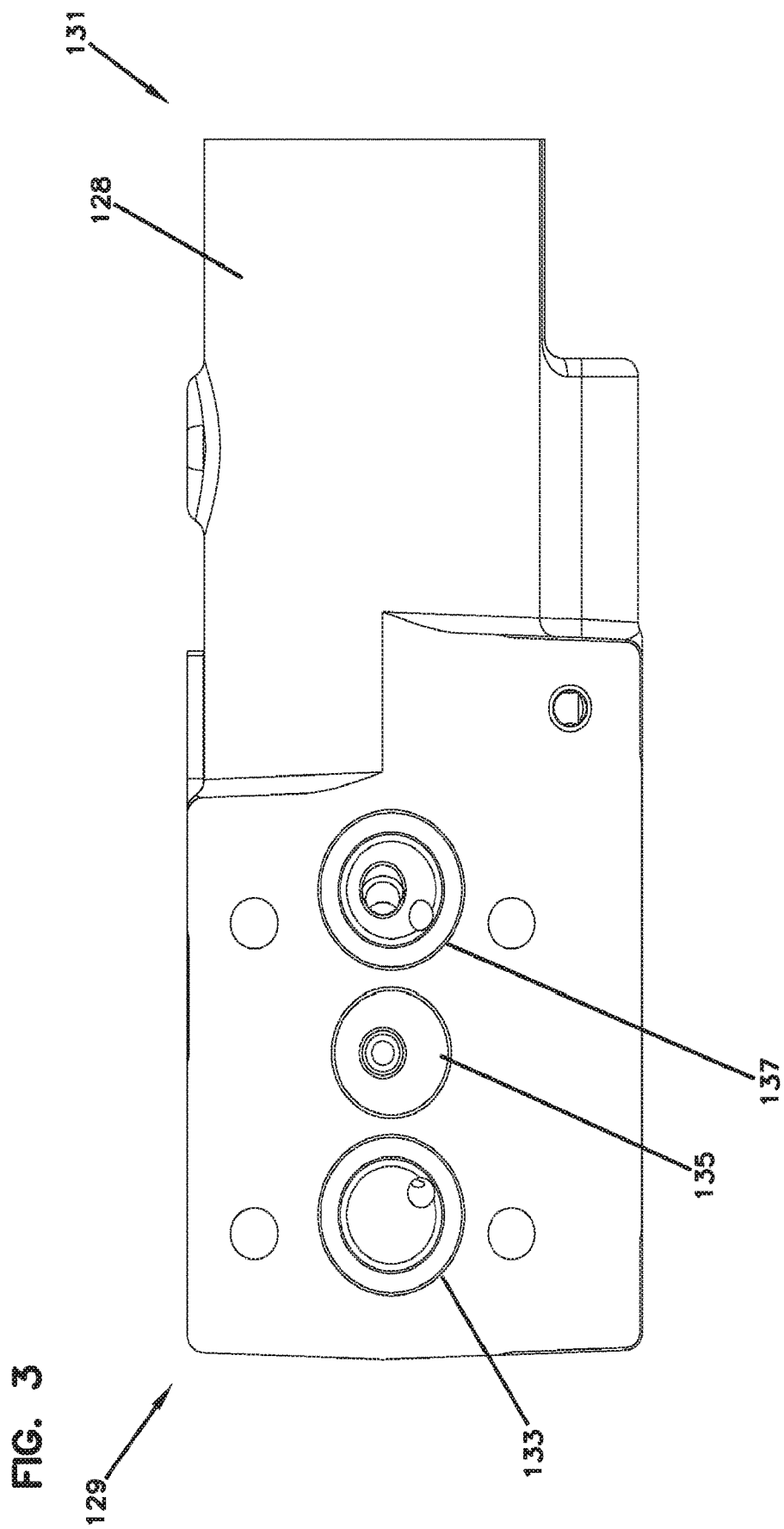
FIG. 3 illustrates a bottom view of the electro-hydraulic proportional pressure control valve of FIG. 2.

As shown, the EHPPCV arrangement 108 includes a valve block 128 that is configured to house the spring-loaded piston cylinder 116, the solenoid powered valve 114, and the spool valve 115. The valve block 128 has a first side 129 and a second side 131. Additionally, as shown in a bottom view of the EHPPCV arrangement 108 in FIG. 3, the valve block 128 includes a plurality of ports that include a pump output port 133, a pump displacement control port 135, and a tank fluid port 137. The pump output port 133 is configured to be fluidly connected to the hydraulic circuit 112, the pump displacement control port 135 is configured to be fluidly connected to the swash plate piston fluid line 126, and the tank fluid port 137 is configured to be fluidly connected to the tank fluid line 124.

Figure 4:
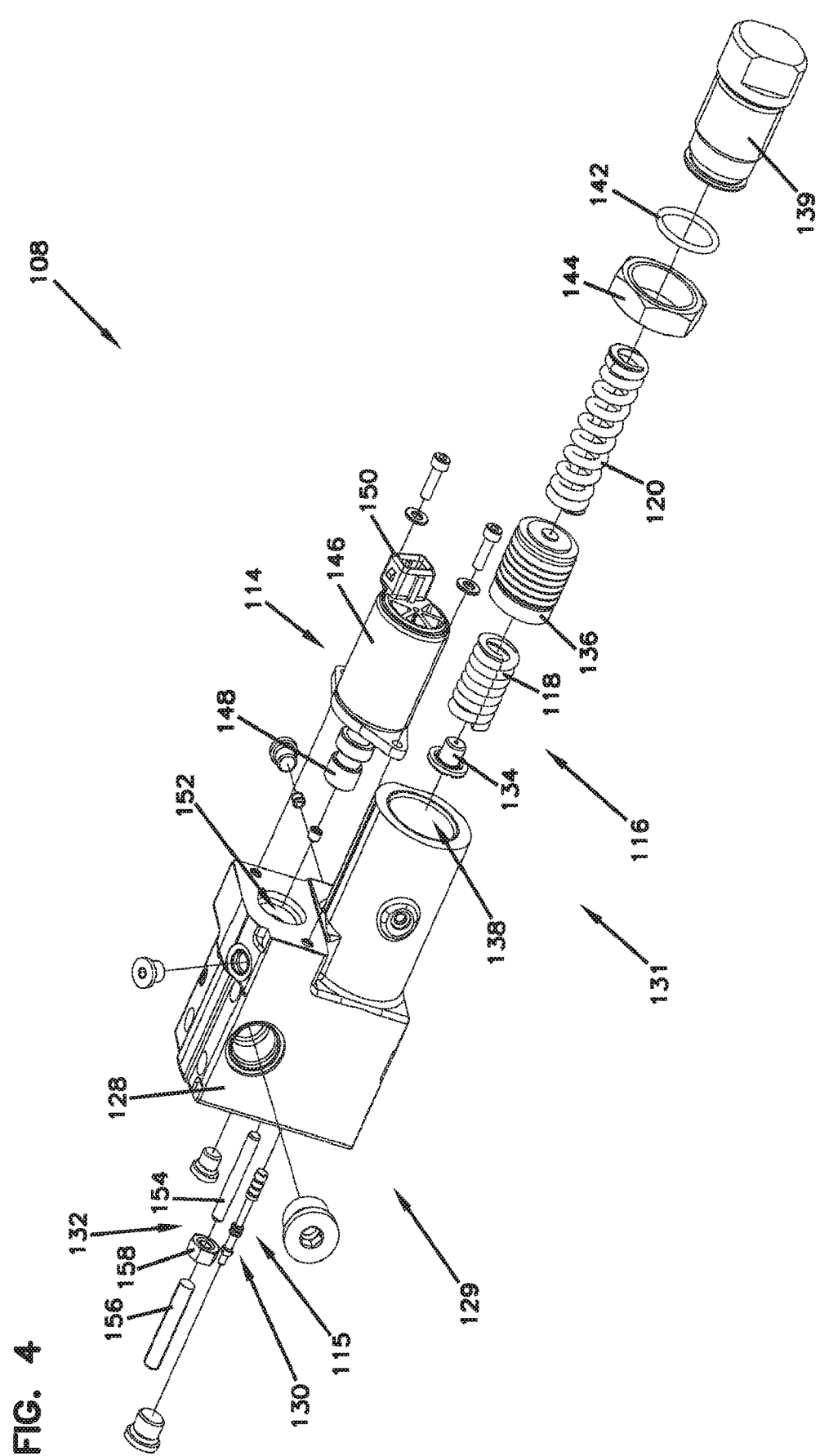
FIG. 4 illustrates an exploded view of the electro-hydraulic proportional pressure control valve of FIG. 2.

FIG. 4 shows an exploded view of the EHPPCV arrangement 108. The EHPPCV arrangement 108 is shown to include the spring-loaded piston cylinder 116, solenoid powered valve 114, the spool valve 115, a stop structure 132, and a plurality of plugs.

The spring-loaded piston cylinder 116 is shown to include a plunger 134, the first spring 118, a piston 136, the second spring 120, and a piston chamber plug 139. The plunger 134, first spring 118, piston 136, and second spring 120 are all housed within a piston chamber 138 defined by the valve block 128 and sealed within the piston chamber 138 by the piston chamber plug 139. The piston chamber plug 139 seals within the piston chamber 138 by way of a seal 142 and is secured to the valve block 128 by a lock nut 144.

The solenoid powered valve 114 includes a solenoid 146, a valve shaft 148, and a connection plug 150 for attaching an electrical connection to the controller. The solenoid powered valve 114 is configured to be connected to the valve block 128 and seated in a solenoid powered valve chamber 152 defined by the valve block 128.

Figure 6:
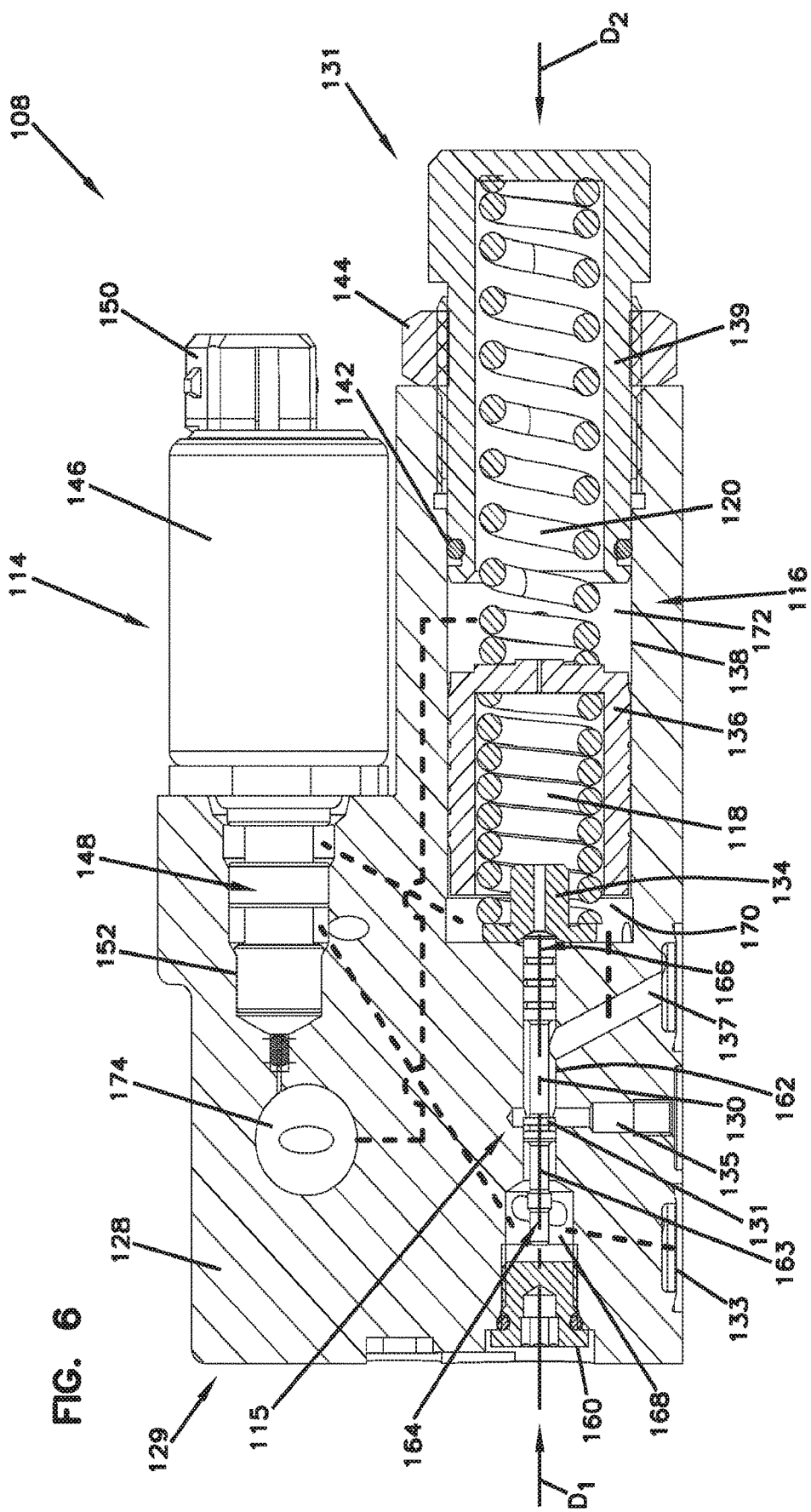
FIG. 6 illustrates a cross-sectional view along line 6-6 in FIG. 5 of the electro-hydraulic proportional pressure control valve of FIG. 2.

The spool valve 115 includes a spool 130 mounted within the valve block 128 (shown in detail in FIG. 6). The spool 130 is configured to control the flow of fluid to the swash plate piston 106 by way of the pump displacement control port 135.

The stop structure 132 is also mounted within the valve block 128. The stop structure 132 is configured to limit the movement of the piston 136 within the piston chamber 138. The stop structure 132 includes a first shaft 154, a second shaft 156, and a locking nut 158.

Figure 5:
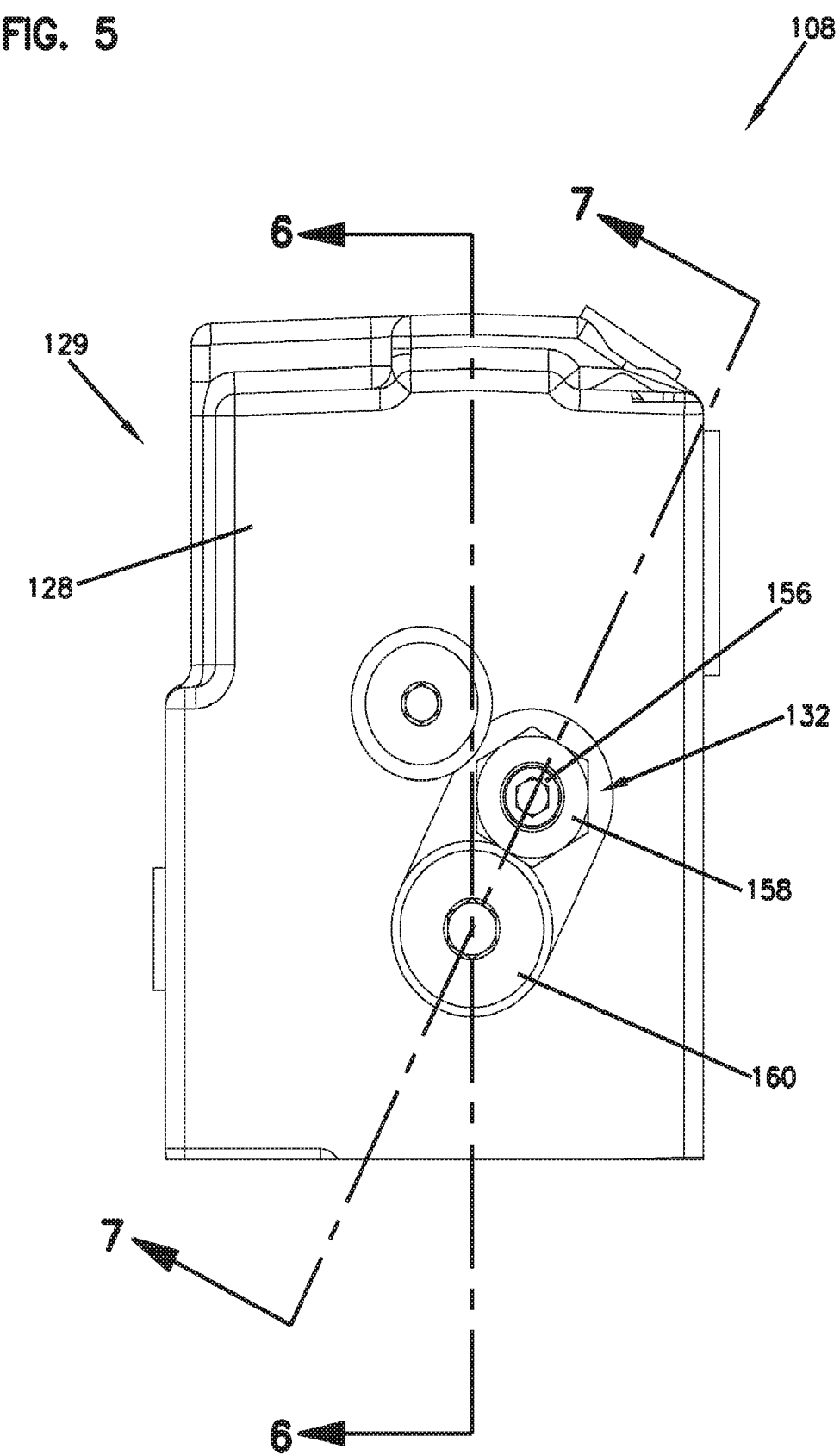
FIG. 5 illustrates a side view of the electro-hydraulic proportional pressure control valve of FIG. 2.

FIG. 5 shows the EHPPCV arrangement 108 from the first side. Specifically, the stop structure 132 is shown installed within the valve block 128. As shown, the second shaft 156 and the locking nut 158 are shown positioned outside of the valve block 128. A spool plug 160 is also shown and is configured to seal a spool bore (shown in FIG. 6) in which the spool 130 is housed within the valve block 128.

FIG. 6 shows a cross-sectional view of the EHPPCV arrangement 108 along line 6-6 in FIG. 5. Due to the fact that a single cross section cannot be used to capture all fluid passageways and cavities within the valve block 128, dotted lines are used to show the fluid paths within the EHPPCV arrangement 108.

The spool 130 of the spool valve 115 is shown movably mounted within a spool bore 162 within the valve block 128. The spool 130 includes a centrally positioned land structure 131 that acts to control the flow of fluid through the pump displacement control port 135. The spool bore 162 defines a spool axis 163, and the spool 130 is movable along the axis between a first position and a second position. When in the first position, the tank fluid port 137 is in fluid communication with the pump displacement control port 135, and when in second position, the pump output port 133 is in fluid communication with the pump displacement control port 135. In FIG. 6, the spool 130 is shown in the first position. The spool 130 can move between the first and second positions. In the first position, due to the lower relative pressure in the tank 104 with respect to the hydraulic circuit 112, a lower pressure fluid is supplied to the swash plate piston 106. In the second position, a higher fluid pressure from the hydraulic circuit 112 is supplied to the swash plate piston 106 causing the swash plate piston 106 to move, thereby decreasing the angle of the swash plate within the pump 102 and lowering the displacement (i.e., de-stroke) of the pump 102.

To facilitate the movement of the spool 130 between the first and second positions, a first chamber 168 and the piston chamber 138 are positioned at either end 164, 166 of the spool 130 of the spool valve 115. Each chamber 168, 138 is configured to exert a force on the spool 130 in order to influence the spool's movement.

The first chamber 168 is positioned at the first end 164 of the spool 130 and is in fluid communication with the pump output port 133, and thereby the hydraulic circuit 112. The first chamber 168 receives a pressurized fluid that is representative of the pump outlet pressure when the EHPPCV arrangement 108 is installed on the pump 102. The pressure within the first chamber 168 exerts a force on the spool 130 in a direction D1 toward the second side 131 of the valve block 128.

The piston chamber 138 is positioned at the second end 166 of the spool 130. The piston chamber 138 is configured to exert a force on the spool 130 in a direction D2 toward the first side 129 of the valve block 128. The piston chamber includes a first section 170 and second section 172, divided by the piston 136. In the depicted embodiment, a force is exerted on the plunger 134 by the first spring 118. A force is exerted on the first spring 118 by the piston 136, and a force is exerted on the piston 136 by the second spring 120. Additionally, the first and second sections 170, 172 of the piston chamber 138 are configured to receive a fluid pressure to further change the overall force applied to the spool 130 by the piston chamber 138.

The piston 136 is movable within the piston chamber 138. As forces change within the first section 170 and second section 172, the piston moves within the piston chamber 138, thereby changing the overall force exerted on the plunger 134 on the second end 166 of the spool 130 by compressing or decompressing the first spring 118. The piston 136 can also seal the first section 170 from the second section 172, so as to allow each section to maintain different pressures and forces.

The first section 170 of the piston chamber 138 is positioned between the second end 166 of the spool 130 and the piston 136 within the piston chamber 138. The first section 170 is shown to include the first spring 118 and the plunger 134. Also, the first section 170 is shown to be in fluid communication with the tank fluid port 137, thereby receiving a tank pressure. The tank pressure and first spring 118 exert a resistance force on the piston 136 in a direction toward the second side 131 of the valve block 128. In some embodiments, the tank pressure will be close to zero and the first spring 118 will exert the only force on the plunger 134 and piston 136

The second section 172 of the piston chamber 138 includes the second spring 120 positioned between the piston 136 and the piston chamber plug 139. The second spring 120 is configured to apply an adjustable preload force to the piston 136. The force exerted by the second spring 120 can be altered by the position of the piston chamber plug 139 within the piston chamber 138. Such positioning is adjustable by the user and the piston chamber plug 139 can be secured with respect the piston chamber 138 by way of the lock nut 144.

The second section 172 is also configured to receive a regulated pressure from the solenoid powered valve 114. In some embodiments, the solenoid powered valve 114 is configured to deliver between zero pressure and a pressure that is greater than tank pressure but less or equal to than the pump outlet pressure. When there is a balance of fluid pressures between the first section 170 and the second section 172, the force that is exerted on the plunger 134 is equal to the force exerted by the first spring 118. Such a force can be altered by altering the force of the second spring, which either compresses or decompressing the first spring 118 by allowing the piston 136 to move within the piston chamber 138.

The solenoid powered valve 114 is configured to be in fluid communication with both the pump output port 133 and the tank fluid port 137. The current delivered to the solenoid 146 of the solenoid powered valve 114 can be varied so as to change the positioning of the valve shaft 148. Changing the positioning of the valve shaft 148 changes the regulated fluid pressure in the regulated fluid pressure cavity 174. The regulated fluid pressure is then delivered from the regulated fluid pressure cavity 174 to the second section 172 of the piston chamber 138. The magnitude of the regulated fluid pressure from the solenoid powered valve 114 is directly proportional to a current provided to the solenoid 146.

Figure 7:
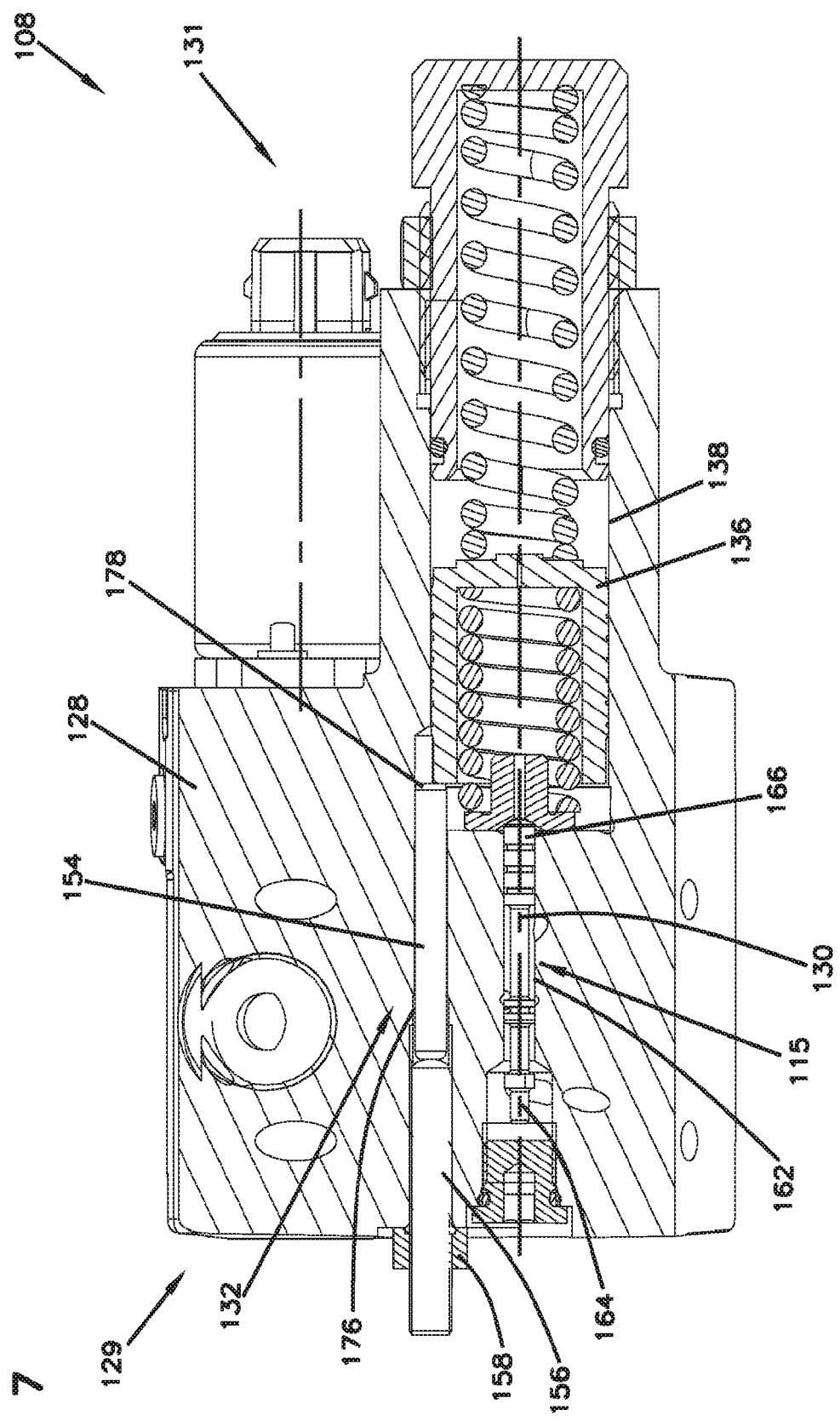
FIG. 7 illustrates a cross-sectional view along line 7-7 in FIG. 5 of the electro-hydraulic proportional pressure control valve of FIG. 2.

FIG. 7 shows a cross-sectional view of the EHPPCV arrangement 108 along line 7-7 in FIG. 5. Specifically, FIG. 7 shows the stop structure 132 that includes the first shaft 154, second shaft 156, and locking nut 158. The stop structure 132 is mounted within a stop structure bore 176. The stop structure bore 176 is parallel to the spool bore 162. The stop structure 132 includes a positive stop 178 that prevents the movement of the piston 136 past the positive stop 178 in a direction toward the first side 129 of the valve block 128. By limiting the movement of the piston 136, the maximum threshold for the force that the piston 136 transfers to the first spring 118 in the direction toward the first side 129 is limited. Additionally the location of the positive stop 178 can be altered. When installed within the valve block 128, the locking nut 158 and second shaft 156 are accessible from outside of the valve block 128 so that the location of the positive stop 178, and therefore the overall stop structure 132, can be adjusted. In some embodiments, the stop structure 132 is threaded into the valve block 128 and can be rotated for adjustment.

The stop structure 132 helps to prevent the over pressurizing of the swash plate piston 106, thereby preventing the pump 102 from over pressurizing the hydraulic circuit 112. The stop structure 132 is a safety device to prevent the hydraulic circuit 112 from being damaged inadvertently. Because the force exerted on the second end 166 of the spool 130 in the second direction D2 by the piston cylinder 116 opposes the force exerted on the first end 164 of the spool 130 in the first direction D1 by the hydraulic circuit 112, the difference in opposing forces determines the maximum hydraulic circuit pressure. Therefore, the greater the force produced by the piston cylinder 116, specifically on the plunger 134, in the second direction D2, the greater the maximum pressure in the hydraulic circuit 112. However, the stop structure 132 helps to prevent the maximum pressure in the hydraulic circuit 112 from becoming set at too high of a value. For example, a failure in the controller that supplies the current to the solenoid powered valve 114 could inadvertently introduce a higher than intended regulated pressure to the second section of the piston chamber 138. Under maximum compression, the opposing force in in the first chamber 168, which is equivalent to the pressure of the hydraulic circuit 112, must be greater than the force exerted by the first spring 118 on the plunger 134 to force the movement of the spool 130 and de-stroke the pump 102. For particular application, too high of a pressure within the hydraulic circuit 112 could lead to damage of the circuit itself and equipment in fluid communication therewith. However, to guard against an event like this, the stop structure 132 prevents the movement of the piston 136, thereby preventing the over compression of the first spring 118 and setting a maximum pressure for the hydraulic circuit 112. During operation, the force in the second section 172 is transferred to the piston 136 and then to the spring 118, thereby effecting the compression of the spring 118. Once the piston 136 has compressed the spring 118 to a point where the piston 136 is positioned within the piston cylinder 138 against the positive stop 178 of the stop structure 132, any additional force in the direction D2 from the piston 136 is transferred to the stop structure 132 and into the valve block 128, rather than the first spring 118.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A pump control assembly for controlling a variable displacement hydraulic pump, the pump control assembly comprising:
    a valve block defining a spool bore having a central bore axis, the valve block also defining a pump output port, a pump displacement control port, and a tank port;
    a spool mounted within the spool bore, the spool having a first end and an opposite second end, the spool being movable within the spool bore along the central bore axis between a first position where the tank port is in fluid communication with the pump displacement control port and a second position in which the pump output port is in fluid communication with the pump displacement control port, the spool moving in a first direction along the central bore axis when moving from the first position toward the second position, and the spool moving in a second direction along the central bore axis when moving from the second position toward the first position, the first and second directions being opposite from one another;
    a first chamber positioned at the first end of the spool, the first chamber being in fluid communication with the pump output port so as to be configured to receive a pump output pressure from the variable displacement pump when the pump control assembly is installed on the variable displacement pump, wherein when the pump output pressure is applied to the first chamber, the pump output pressure applies a pump output pressure force to the spool in the first direction;
    a second chamber positioned at the second end of the spool;
    a piston positioned within the second chamber so as to divide the second chamber into a first section and a second section, the first section being positioned between the piston and the second end of the spool, the piston being movable within the second chamber along the central bore axis;
    a first spring positioned within the first section of the second chamber for transferring a piston force in the second direction from the piston to the spool;
    a second spring positioned within the second section of the second chamber for applying a pre-load force to the piston for biasing the piston in the second direction; and
    a proportional pressure reducing valve mounted within the valve block, the proportional pressure reducing valve being operable in a first state where the tank port is in fluid communication with the second section of the second chamber and a second state where the pump output port is in fluid communication with the second section of the second chamber, the proportional pressure reducing valve being configured to convert the pump output pressure into a reduced pressure that is provided at the second section of the second chamber, wherein the reduced pressure at the second section of the second chamber acts on the piston to apply a reduced pressure force to the piston in the second direction, and the magnitude of the reduced pressure output from the proportional pressure reducing valve being directly proportional to a current provided to a solenoid of the proportional pressure reducing valve.

2. The pump control assembly of claim 1, wherein the valve block includes a first side and an opposite second side, wherein the first chamber is closed by a first plug mounted at the first side of the valve block, and the second chamber is closed by a second plug mounted at the second side of the valve block.

3. The pump control assembly of claim 2, wherein the second spring is captured between the piston and the second plug, and wherein an axial position of the second plug along the central bore axis can be adjusted to adjust the pre-load force applied to the piston by the second spring.

4. The pump control assembly of claim 1, wherein the proportional pressure reducing valve includes a reducing valve spool linearly movable between a first position corresponding to the first state and a second position corresponding to the second state, wherein the solenoid acts on a first end of the reducing valve spool, and wherein the reduced pressure acts on a second end of the reducing valve spool.

5. A pump control assembly for controlling a variable displacement hydraulic pump, the pump control assembly comprising:
    a valve block defining a spool bore, the valve block also defining a first port, a second port, and a third port;
    a spool mounted within the spool bore and being movable within the spool bore between a first position where the second port is in fluid communication with the third port and a second position in which the first port is in fluid communication with the second port;
    a first chamber positioned at a first end of the spool;
    a second chamber positioned at a second end of the spool;
    a piston positioned within the second chamber so as to divide the second chamber into a first section and a second section, the first section being positioned between the piston and the second end of the spool;
    a first spring positioned within the first section of the second chamber;
    a second spring positioned within the second section of the second chamber;
    a proportional pressure reducing valve mounted within the valve block, the proportional pressure reducing valve being operable in a first state where the third port is in fluid communication with the second section of the second chamber and a second state where the first port is in fluid communication with the second section of the second chamber; and
    a stop structure having a positive stop that stops movement of the piston at a stop position.

6. The pump control assembly of claim 5, wherein the stop structure defines a maximum threshold for piston force transferred by the first spring, and wherein a position of the stop structure is adjustable to adjust the maximum threshold of the piston force.

7. The pump control assembly of claim 5, wherein the stop structure is threaded within the valve block and is turned within the valve block to adjust the stop position.

8. The pump control assembly of claim 7, wherein a lock nut is provided for locking the stop structure at a desired stop position.

9. The pump control assembly of claim 7, wherein the stop structure is mounted within a stop structure bore defined by the valve block, wherein the stop structure bore extends from a first side of the valve block to the second chamber, and wherein the stop structure is axially movable within the stop structure bore to adjust the stop position.

10. The pump control assembly of claim 9, wherein the stop structure is rotated about a central axis of the stop structure to adjust the stop position.

11. The pump control assembly of claim 10, wherein the stop structure includes an adjustment screw threaded within the stop structure bore, and wherein an end of the adjustment screw forms the positive stop.

12. The pump control assembly of claim 11, wherein a head of the adjustment screw is accessible at the first side of the valve block.

13. The pump control assembly of claim 7, wherein the stop structure is accessible from outside the valve block to allow the stop position to be adjusted.

14. The pump control assembly of claim 5, wherein the first port corresponds to a pump output port, the second port corresponds to a pump displacement port, and the third port corresponds to a tank port.

15. A pump control assembly for controlling a variable displacement hydraulic pump, the pump control assembly comprising:
a valve block defining a spool bore, the valve block also defining a first port, a second port, and a third port;
a spool mounted within the spool bore and being movable within the spool bore between a first position where the second port is in fluid communication with the third port and a second position in which the first port is in fluid communication with the second port;
a first chamber positioned at a first end of the spool;
a second chamber positioned at a second end of the spool;
a piston positioned within the second chamber so as to divide the second chamber into a first section and a second section, the first section being positioned between the piston and the second end of the spool;
a first spring positioned within the first section of the second chamber;
a second spring positioned within the second section of the second chamber; and
a proportional pressure reducing valve mounted within the valve block, the proportional pressure reducing valve being operable in a first state where the third port is in fluid communication with the second section of the second chamber and a second state where the first port is in fluid communication with the second section of the second chamber.

16. The pump control assembly of claim 15, wherein the valve block includes a first side and an opposite second side, wherein the first chamber is closed by a first plug mounted at the first side of the valve block, and the second chamber is closed by a second plug mounted at the second side of the valve block.

17. The pump control assembly of claim 16, wherein the second spring is captured between the piston and the second plug, and wherein an axial position of the second plug along a central bore axis can be adjusted to adjust a pre-load force applied to the piston by the second spring.

18. The pump control assembly of claim 15, wherein the proportional pressure reducing valve includes a reducing valve spool linearly movable between a first position corresponding to a first operating state and a second position corresponding to a second operating state, wherein a solenoid acts on a first end of the reducing valve spool, and wherein the reduced pressure acts on a second end of the reducing valve spool.

19. The pump control assembly of claim 15, wherein the first port corresponds to a pump output port, the second port corresponds to a pump displacement port, and the third port corresponds to a tank port.

* * * * *